(12) United States Patent
Okajima

(10) Patent No.: US 8,665,460 B2
(45) Date of Patent: Mar. 4, 2014

(54) PRINT SYSTEM, PRINTING APPARATUS, PRINTING METHOD AND PRINTING PROGRAM

(75) Inventor: Ryousuke Okajima, Hachioji (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 95 days.

(21) Appl. No.: 13/311,796

(22) Filed: Dec. 6, 2011

(65) Prior Publication Data

US 2012/0162679 A1 Jun. 28, 2012

(30) Foreign Application Priority Data

Dec. 22, 2010 (JP) ................. 2010-286228

(51) Int. Cl.
*G06F 15/00* (2006.01)
(52) U.S. Cl.
USPC .................................................. 358/1.13
(58) Field of Classification Search
USPC .................................................. 358/1.13
See application file for complete search history.

(56) References Cited

U.S. PATENT DOCUMENTS 6,809,831 B1 10/2004 Minari
2009/0138878 A1* 5/2009 Fernstrom et al. ............ 718/102

FOREIGN PATENT DOCUMENTS

JP 2000-035867 A 2/2000

* cited by examiner

*Primary Examiner* — Saeid Ebrahimi Dehkordy
(74) *Attorney, Agent, or Firm* — Buchanan Ingersoll & Rooney PC

(57) ABSTRACT

A printing system includes a plurality of printing apparatuses connected with each other via a network including a transfer source printing apparatus having a first printing apparatus that receives print data and a transfer destination printing apparatus having a second printing apparatus. The transfer source printing apparatus is equipped with a process instruction unit for transmitting to the transfer destination printing apparatus in an idle status a processing program and process data for executing a process of generating image data from the print data, and requesting the process to be executed, when the transfer source printing apparatus is not in an idle status when it receives the print data. The transfer destination printing apparatus is equipped with a transmitting unit for transmitting to the transfer source printing apparatus the output data generated from the process data by the process in the process.

20 Claims, 24 Drawing Sheets

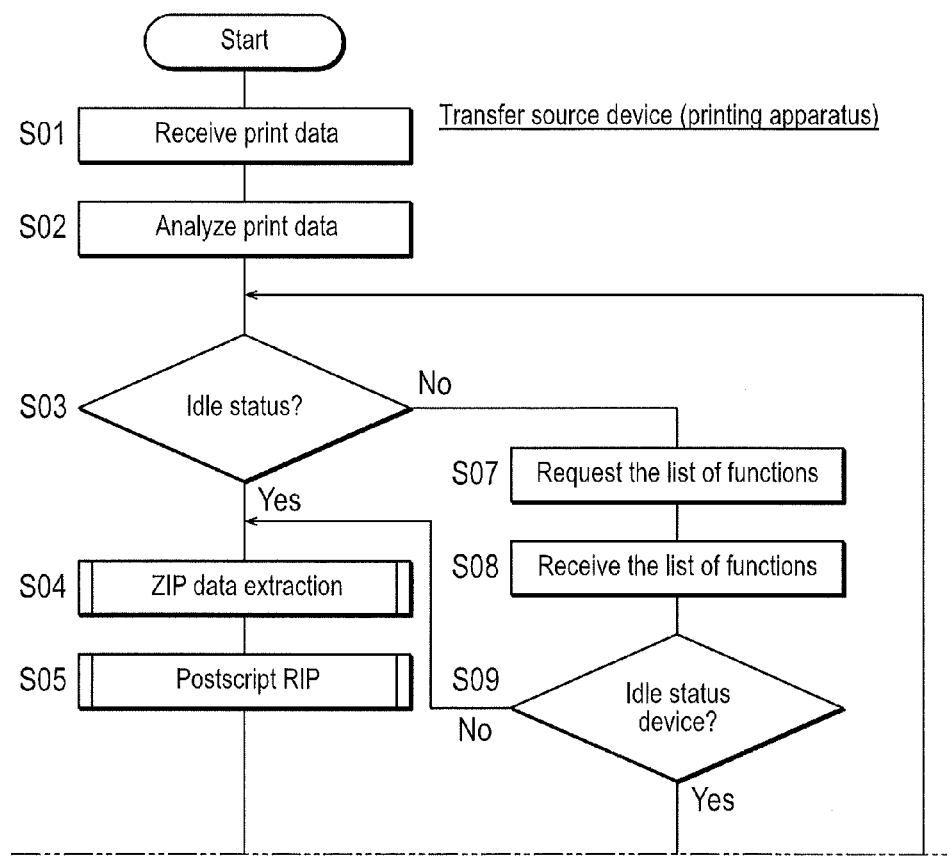

FIG.6

List of functions

Printing apparatus 300B

| |
|---|
| Machine:192.168.0.1 ← ——————— Shows own IP address |
| Status:idle ← ——————————— Shows that status is idle |
| Function1:ZIP Encode ← ————— Shows that ZIP compression is possible |
| Function2:ZIP Decode ← ————— Shows that ZIP extraction is possible |
| Function3:Postscript RIP ← —— Shows that Postscript format PDL RIP is possible |
| Function4:PCL RIP ← ————————— Shows that PCL format PDL RIP is possible |
| Function5:PDF RIP ← ————————— Shows that PDF format PDL RIP is possible |
| Function6:JPEG Decode ← ————— Shows that JPEG extraction is possible |

Printing apparatus 300C

| |
|---|
| Machine:192.168.0.10 |
| Status:busy ← ——————— Shows that it is in printing process |
| Function1:ZIP Decode |
| Function2:Postscript RIP |

Printing apparatus 300D

| |
|---|
| Machine:192.168.0.9 |
| Status:idle |
| Function1:PCL RIP |
| Function2:PDF RIP |
| Function3:JPEG Decode |

FIG.7

List of functions

Printing apparatus 300B

```
Machine:192.168.0.1
Status:busy
Function1:ZIP Encode
Function2:ZIP Decode
Function3:Postscript RIP
Function4:PCL RIP
Function5:PDF RIP
Function6:JPEG Decode
```

Printing apparatus 300C

```
Machine:192.168.0.10
Status:busy
Function1:ZIP Decode
Function2:Postscript RIP
```

Printing apparatus 300D

```
Machine:192.168.0.9
Status:idle
Function1:PCL RIP
Function2:PDF RIP
Function3:JPEG Decode
```

FIG.8

List of instructions for program addition

```
<Register>  ←——————————————— Shows instructions for processing program addition
<Process=1>  ←——————————————— Shows first processing program
      <Funcition="ZIP Decode"/>  ←— Shows function of processing program
      <Data="zip_decode.o"/>  ←——— Processing program file name
      <Delete=Complete>  ←——————— Delete timing for processing program
                                   It shows "Delete when processing is completed"
                                   in this case.
</Process>
<Process=2>  ←——————————————— Shows second processing program
      <Funcition="Postscript RIP"/>
      <Data="ps.o"/>
      <Dalete=NONE>  ←——————————— Shows "Do not delete"
</Process>
<Machine="192.168.0.1"/>
</Register>
```

FIG.9

List of process instructions

```
<Request>                              ← Shows start of process request command
<Data="test.zip"/>                     ← Shows file name of the data to be sent (transmitted)
<Process=1>                            ← Shows start of first process instruction
    <Funcition="ZIP Decode"/>          ← Shows process contents of first process
    <Input="test.zip"/>                ← Shows input data to be used in the process
    <Output="decode.ps"/>              ← Shows data to be generated in the process
</Process>                             ← Shows end of first process instruction
<Process=END>                          ← Shows instruction of the final process
    <Funcition="Postscript RIP"/>      ← Shows PS RIP process
    <Input="ecode.ps"/>
</Process>
<Reply>                                ← Shows the start of instruction for transfer source
                                         printing apparatus to which Lists of process results
                                         and process result data are transmitted (returned)

<IP Address="192.168.0.240"/>      ← Shows IP address of transfer source printing
</Reply>                                 apparatus
</Request>                             ← Shows end of process request command
```

FIG.10

List of process results

```
<Report>                              ← Shows start of process result notice
<Machine="192.168.0.1"/>              ← Shows IP address of device that executed the process
<Process=1>                           ← Shows instruction requested
      <Funcition="ZIP Decode"/>       ← Shows actual process contents
      <Result=OK/>                    ← Shows process results
</Process>
<Process=END>
      <Funcition="Postscript RIP"/>
<Result=OK/>
</Process>
<Data=1>                              ← Shows data of first process result
      <Name="Page1.raw">              ← Shows raster data of process results
</Data>
<Data=2>
      <Name="Page2.raw">
</Data>
         ⋮

<Data=100>
      <Name="Page100.raw">
</Data>
</Report>                             ← Shows end of process result notice
```

FIG.14

List of functions

Printing apparatus 300B

```
Machine:192.168.0.1
Status:idle
Function1:ZIP Encode
Function2:ZIP Decode
Function3:Postscript RIP
Function4:PCL RIP
```

Printing apparatus 300C

```
Machine:192.168.0.10
Status:busy
Function1:ZIP Decode
Function2:Postscript RIP
```

Printing apparatus 300D

```
Machine:192.168.0.9
Status:idle
Function1:PCL RIP
Function2:PDF RIP JPEG Decode
```

FIG.15

List of functions

Printing apparatus 300B

```
Machine:192.168.0.1
Status:idle
Function1:ZIP Encode
Function2:PCL RIP
```

Printing apparatus 300C

```
Machine:192.168.0.10
Status:busy
Function1:ZIP Decode
Function2:PDF RIP
```

Printing apparatus 300D

```
Machine:192.168.0.9
Status:idle
Function1:PCL RIP
Function2:PDF RIP
```

FIG.16

List of process instructions

```
<Request>
<Data="test.zip"/>
<Process=1>
        <Location="192.16.0.1"/>  ← Shows device that execute the process
        <Funcition="ZIP Decode"/>
        <Input="test.zip"/>
        <Output="decode. pdf"/>
</Process>
<Process=END>
        <Location="192.16.0.9"/>  ← Shows device that execute the process
        <Funcition="PDF RIP"/>
        <Input="decode.pdf"/>
</Process>
<Reply>
        <IP Address="192.168.0.240"/>
</Reply>
</Request>
```

FIG.18

List of process instructions after correction

```
<Request>
<Data="decode. pdf"/>
<Process=END>
     <Location="192.16.0.9"/>
     <Funcition="PDF RIP"/>
     <Input="decode.pdf"/>
</Process>
<Reply>
     <IP Address="192.168.0.240"/>
</Reply>
</Request>
```

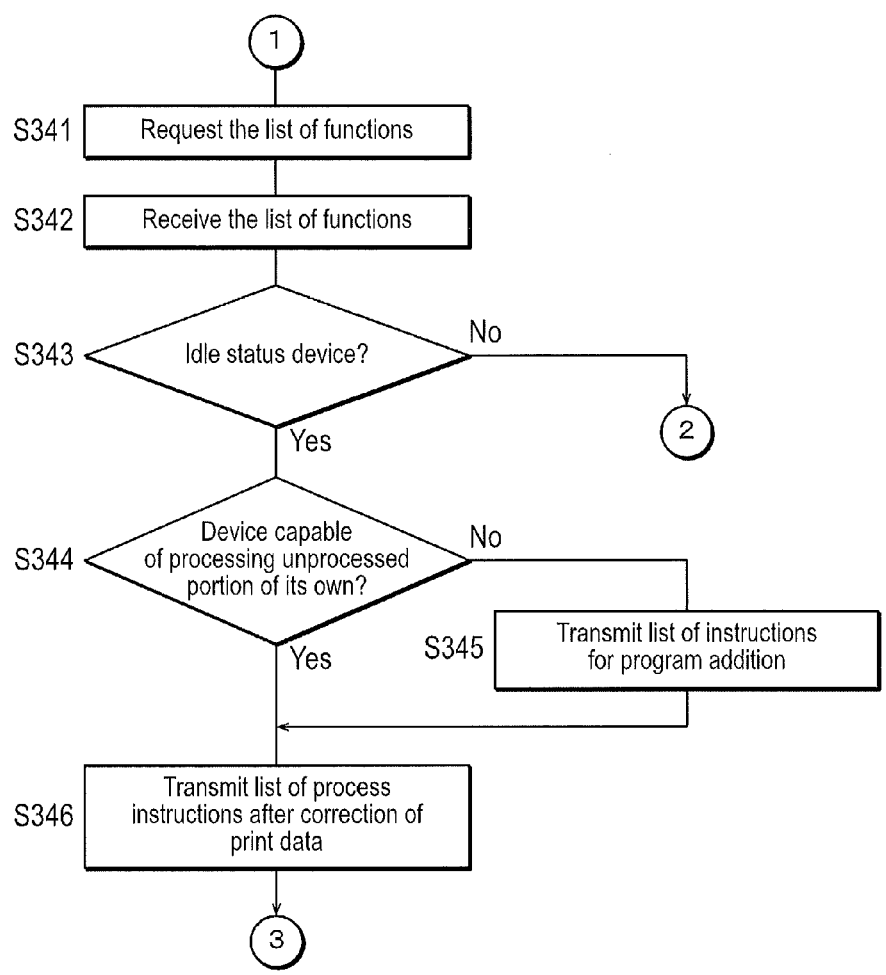

FIG.20

List of functions

Printing apparatus 300B

```
Machine:192.168.0.1
Status:idle
Function1:ZIP Encode
Function2:PCL RIP
Function2:ZIP Decode
```

Printing apparatus 300C

```
Machine:192.168.0.10
Status:idle
Function1:ZIP Decode
Function2:PDF RIP
```

Printing apparatus 300D

```
Machine:192.168.0.9
Status:busy
Function1:PDF RIP
Function2:ZIP Decode
```

FIG.21

List of process instructions

```
<Request>
<Data="decode. pdf"/>
<Process=END>
      <Location="192.16.0.10"/>
      <Funcition="PDF RIP"/>
      <Input="decode.pdf"/>
</Process>
<Reply>
      <IP Address="192.168.0.240"/>
</Reply>
</Request>
```

PRINT SYSTEM, PRINTING APPARATUS, PRINTING METHOD AND PRINTING PROGRAM

CROSS-REFERENCE TO RELATED APPLICATION

This application is based on Japanese Patent Application No. 2010-286228, filed on Dec. 22, 2010, the contents of which are incorporated herein by reference.

BACKGROUND

1. Technical Field

The present invention relates to a printing system, a printing apparatus, a printing method, and a printing program.

2. Description of Related Art

Various techniques have been tried to improve the efficiency of a system as a whole by distributing the load in a printing system where a plurality of printing apparatuses is connected via a network.

For example, in order to effectively use printing apparatuses connected to a network in case when the process of a print job is interrupted, a technique has been proposed to transfer the print job and continue the same process on a transfer destination printing apparatus (e.g., Unexamined Japanese Patent Publication No. 2000-035867).

However, since it is expected for the transfer destination printing apparatus to execute the entire process including the printing process, it has to have equivalent functions as the transfer source printing apparatus has, which may limit the freedom of selection of the destination apparatus, so that it presents a problem in executing the intended distributive processing effectively. Also, it presents another problem that it is impossible to achieve the same kind of color reproduction result at the transfer destination printing apparatus as the transfer source printing apparatus if the color reproduction range of the transfer destination printing apparatus is different from the color reproduction range of the transfer source printing apparatus.

SUMMARY

The present invention is made in order to solve the above-mentioned problem associated with the related art, and to provide a printing system, a printing apparatus, a printing method, and a printing program that provide a higher degree of freedom in selecting the transfer destination and are capable of improving the process efficiency as the entire system.

To achieve at least one of the abovementioned objects, a printing system reflecting one aspect of the present invention comprises a plurality of printing apparatuses connected with each other via a network including a transfer source printing apparatus consisting of a first printing apparatus that receives print data and a transfer destination printing apparatus consisting of a second printing apparatus. The transfer source printing apparatus comprises a process instruction unit for transmitting to the transfer destination printing apparatus in an idle status a processing program and process data for executing a process of generating image data from the print data, and requesting the process to be executed, when the transfer source printing apparatus is not in an idle status when it receives the print data. The transfer destination printing apparatus comprises a transmitting unit for transmitting to the transfer source printing apparatus output data generated from the process data by the process. The transfer source printing apparatus comprises a receiving unit for receiving the output data, and a printing unit for printing the image data generated from the output data received.

To achieve at least one of the abovementioned objects, a printing apparatus reflecting upon another aspect of the present invention is capable of connecting to a transfer destination printing apparatus via a network and comprises: a receiving unit for receiving print data; a process instruction unit for transmitting to the transfer destination printing apparatus in an idle status a processing program and process data for executing a process of generating image data from the print data, and requesting the process to be executed, when the transfer source printing apparatus is not in an idle status when it receives the print data; a receiving unit for receiving output data generated from the process data by the a receiving unit for receiving output data generated from the process data by the process in the transfer destination printing apparatus; and a printing unit for printing the image data generated from the output data received.

To achieve at least one of the abovementioned objects, a printing apparatus reflecting upon another aspect of the present invention is capable of connecting to a transfer source printing apparatus via a network and comprises: a receiving unit for receiving from the transfer source printing apparatus a processing program and process data for executing a process of generating image data from print data; a process executing unit for executing the processing program to generate the output data from the process data; and a transmitting unit for transmitting the output data to the transfer source printing apparatus.

To achieve at least one of the abovementioned objects, a printing method reflecting upon another aspect of the present invention is applied to a printing system comprising a plurality of printing apparatuses connected with each other via a network including a transfer source printing apparatus consisting of a first printing apparatus that receives print data and a transfer destination printing apparatus consisting of a second printing apparatus. The printing method comprises the steps of: requesting the process to be executed when the transfer source printing apparatus is not in an idle status when it receives the print data after transmitting from transfer source printing apparatus to the transfer destination printing apparatus in an idle status a processing program and process data for executing a process of generating image data from the print data; transmitting to the transfer source printing apparatus the output data generated from the process data by the process executed in the transfer destination printing apparatus; receiving the output data in the transfer source printing apparatus; and printing the image data generated from the output data received in the transfer source printing apparatus.

To achieve at least one of the abovementioned objects, a program reflecting upon another aspect of the present invention is for controlling a transfer source printing apparatus in a printing system comprising a plurality of printing apparatuses connected with each other via a network including the transfer source printing apparatus consisting of a first printing apparatus that receives print data, and a transfer destination printing apparatus consisting of a second printing apparatus. The program causes the transfer source printing apparatus to execute the procedures for: requesting the process to be executed when the transfer source printing apparatus is not in an idle status when it receives the print data after transmitting to the transfer destination printing apparatus in an idle status a processing program and process data for executing a process of generating image data from the print data; receiving the output data generated from the process data by the process in the transfer destination printing apparatus; and printing the image data generated from the output data received.

To achieve at least one of the abovementioned objects, a program reflecting upon another aspect of the present invention is for controlling a transfer destination printing apparatus in a printing system comprising a plurality of printing apparatuses connected with each other via a network including a transfer source printing apparatus consisting of a first printing apparatus that receives print data and the transfer destination printing apparatus consisting of a second printing apparatus. The program causes the transfer destination printing apparatus to execute the procedures for: receiving the processing program and the process data from the transfer source printing apparatus comprising a process instruction unit for transmitting to the transfer destination printing apparatus in an idle status a processing program and process data for executing a process of generating image data from the print data and requesting the process to be executed when the transfer source printing apparatus is not in an idle status when it receives the print data, a receiving unit for receiving the output data of the transfer destination printing apparatus, and a printing unit for printing the image data generated from the output data received; executing the processing program to generate the output data from the process data; and transmitting the output data to the transfer source printing apparatus.

The objects, features, and characteristics of this invention other than those set forth above will become apparent from the description given herein below with reference to preferred embodiments illustrated in the accompanying drawings.

BRIEF DESCRIPTION OF THE DRAWINGS

FIG. 5A is a flow chart for describing the operation of the transfer source printing apparatus.

FIG. 6 is a chart for describing the list of functions shown in steps S07 and S08 of FIG. 5A.

FIG. 7 is a chart for describing another example list of functions.

FIG. 8 is a chart for describing the list of instructions for program addition shown in step S11 of FIG. 5B.

FIG. 9 is a chart for describing the list of process instructions shown in step S12 of FIG. 5B.

FIG. 10 is a chart for describing the lists of process results shown in step S13 of FIG. 5B.

FIG. 14 is a chart for describing the list of functions according to the second embodiment of the present invention.

FIG. 15 is a chart for describing the list of functions according to the third embodiment of the present invention.

FIG. 16 is a chart for describing the list of process instructions according to the third embodiment of the present invention.

FIG. 18 is a chart for describing the list of process instructions after correction shown in step S328 of FIG. 17.

FIG. 19B is a flow chart for describing the steps that follow the process shown in FIG. 19A.

FIG. 20 is a chart for describing the list of functions shown in step S342 of FIG. 19B.

FIG. 21 is a chart for describing the list of process instructions after correction shown in step S346 of FIG. 19B.

DETAILED DESCRIPTION

The embodiments of the present invention will be described in detail below with reference to the accompanying drawings.

Figure 1:
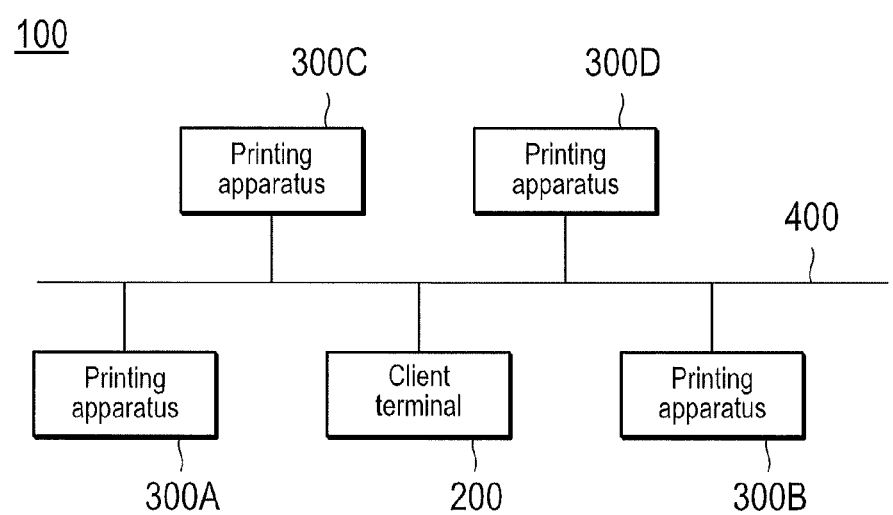
FIG. 1 is a block diagram for describing the printing system according to a first embodiment of the present invention.

FIG. 1 is a block diagram for describing the printing system according to a first embodiment of the present invention.

The printing system 100 according to the first embodiment has a client terminal 200, printing apparatuses 300 (300A-300D), and a network 400 that communicably connects them.

The client terminal 200 consists of a computer, and is used for generating a print job containing print data, and for transmitting it to the printing apparatuses 300.

The printing apparatuses 300 (300A-300D) consist of printing-only machines as well as MFP (Multi-Function Peripheral) comprising copying, printing and scanning functions, and are used for printing the image data generated from the print data included in the received print job.

In the present embodiment, the system is so constituted in such a manner that, when the transfer source device (printing apparatus) consisting of a first printing apparatus receives printing data when it is not in an idle status, it transmits a processing program and process data for executing the process for generating the image data from the print data to the transfer destination device (printing apparatus) consisting of a second printing apparatus that is in an idle status, and requests it to execute said process and then the transfer destination device transmits the output data generated from the process data by said process to the transfer source device and, thereafter, the transfer source device generates said image data from the output data and prints it. Further, the "idle status" here means a status in which the device does not have any ongoing job on hand (a job waiting to be processed) and can immediately start to process the print job it received.

As a consequence, the process can be executed by the transfer destination printing apparatus, which is in an idle status, even when the transfer source printing apparatus is not in an idle status, so that it does not affect the resources that are currently executing the process at the transfer source printing apparatus (does not cause any delay in the job operation being currently executed), thus improving the process efficiency as a whole system. Since the transfer destination printing apparatus receives the processing program from the transfer source printing apparatus, it does not have to have the same function as the transfer source printing apparatus, so that it provides a greater degree of freedom in selecting the transfer destination. Moreover, since the final printing process is executed at the transfer source printing apparatus, there is no need to consider the color reproduction range of the transfer destination printing apparatus.

The network 400 consists of various communication networks including LAN (Local Area Network) that connects computers and network devices with each other, WAN (Wide Area Network) that connects LANs via dedicated lines, Internet, and their combinations based on standards such as Ethernet (Registered Trademark), Token Ring, and FDDI (Fiber-Distributed Data Interface). The network protocol used here is, for example, TCP/IP (Transmission Control Protocol/Internet Protocol). The types and quantities of devices to be connected to the network 400 are not limited to the example shown in FIG. 1.

Figure 2:
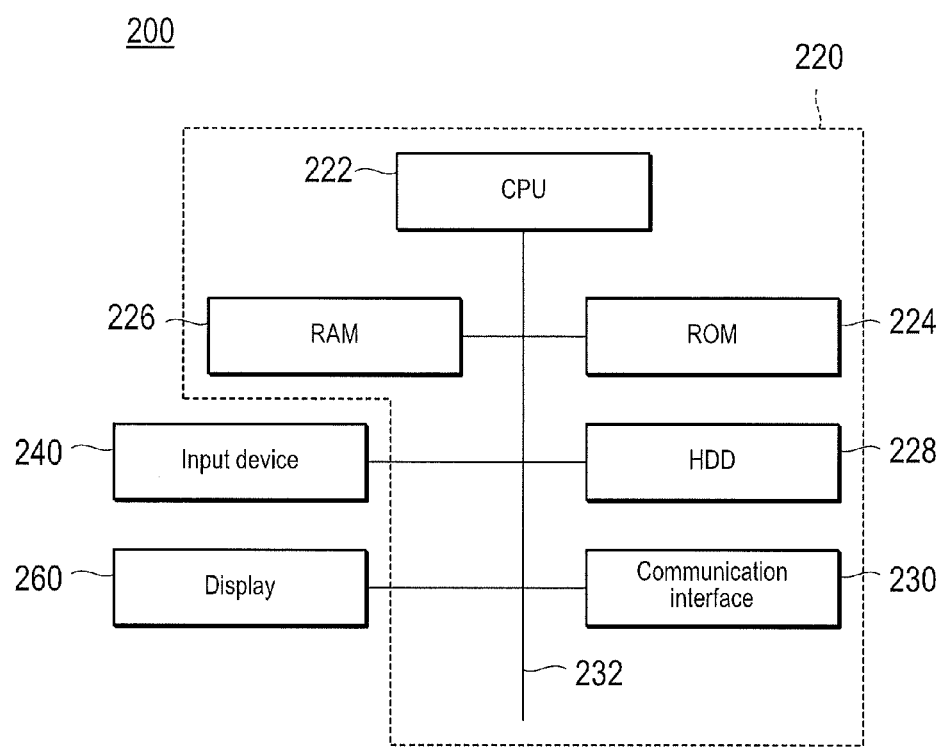
FIG. 2 is a block diagram for describing the client terminal shown in FIG. 1.

FIG. 2 is a block diagram for describing the client terminal shown in FIG. 1.

The client terminal 200 has a main unit 220, an input device 240, and a display 260.

The main unit 220 has a CPU 222, a ROM 224, a RAM 226, a hard disk (HDD) 228, and a communication interface 230, all of which are interconnected via a bus 232.

The CPU 222 is a control circuit comprising microprocessors and others that control the aforementioned various parts and execute various arithmetic processes according to programs, and various functions of the client terminal 200 are realized as the CPU 222 executes the corresponding programs. The ROM 224 is a read-only storage device for storing various programs and data. The RAM 226 is a high speed random access storage device for temporarily storing programs and data as a working area.

The HDD 228 is a large capacity random access storage device for storing various programs including an OS (operating system), application software, a printer driver and various kinds of data. The stored program is read out as it becomes necessary by the CPU 222 and is executed on the RAM 226. It is possible to store a portion of the programs and data held in the ROM 224 into the HDD 228 and store a portion of the programs and data held in the HDD 228 into the ROM 224 as needed.

The application software is a document preparation program used for preparing print data. The standards of print data are, e.g., XPS (XML (Extensible Markup Language) Paper Specification), PDF (Portable Document Format), and TIFF (Tagged Image File Format).

The printer driver is used for converting electronic document data into print data based on a language format applicable to the printing apparatus 300, and for transmitting it, after it is compressed for minimizing the data transmission quantity, as a print job to the printing apparatus 300 via the network 400. The language format is, for example, a PDL (Page Description Language) such as PostScript (Registered Trademark) and PCL (Printer Control Language). The compression format is not limited to any specific item and can be, for example, ZIP.

The communication interface 230 is a communication unit consisting of an extender (LAN board) that adds a communication function via the network 400 to the client terminal 200, and is used to connect with the printing apparatuses 300 (300A-300D) via the network 400 and execute the data sending/receiving.

The input device 240 has a keyboard and a pointing device such as a mouse and is used by the user for executing, for example, text input, various settings and various instructions (inputs). The display 260 is, for example, a CRT (Cathode Ray Tube) display or LCD (Liquid Crystal Display), and is used for displaying various kinds of information using a GUI (Graphic User Interface) screen.

Figure 3:
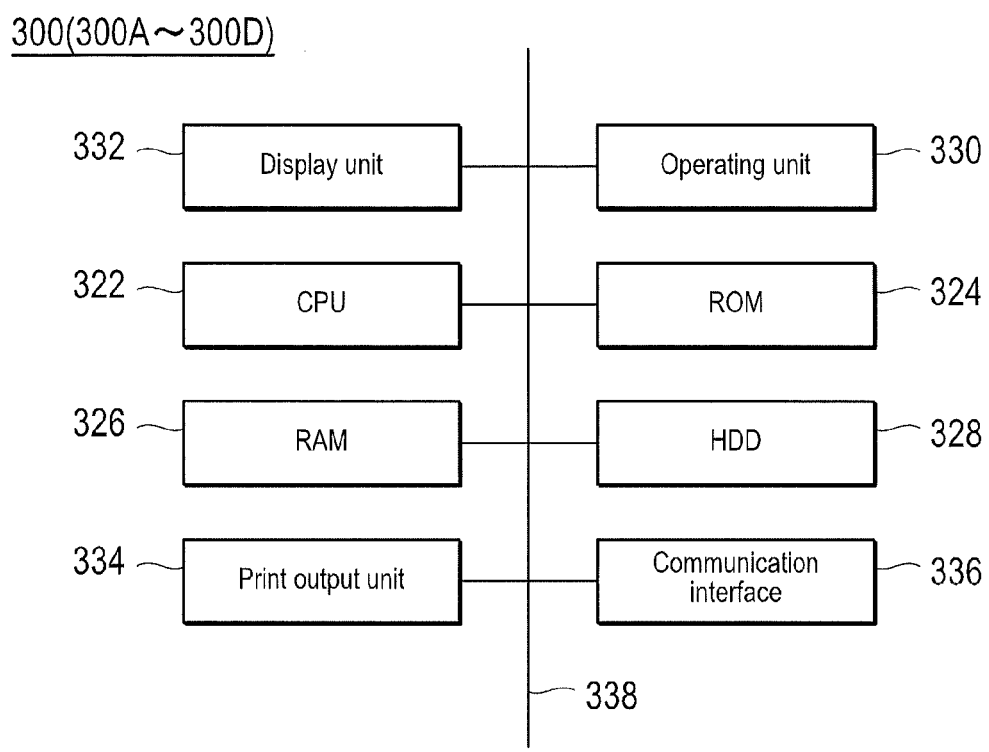
FIG. 3 is a block diagram for describing the printing apparatus shown in FIG. 1.

FIG. 3 is a block diagram for describing the printing apparatus shown in FIG. 1.

The printing apparatuses 300 (300A-300D) are each equipped with a CPU 322, a ROM 324, a RAM 326, an HDD 328, an operating unit 330, a display unit 332, a print output unit 334, and a communication interface 336, all of which are interconnected via a bus 338.

The CPU 322 is a control circuit comprising microprocessors and others that control the aforementioned various parts and execute various arithmetic processes according to programs, and various functions of the printing apparatus 300 are realized as the CPU 322 executes the corresponding programs. The ROM 324 is a read-only storage device for storing various processing programs and data. The RAM 326 is a high speed random access storage device for temporarily storing programs and data as a working area.

The HDD 328 is a large capacity random access storage device for storing various processing programs including an OS and a printer driver and various kinds of data. The stored program is read out as it becomes necessary by the CPU 322 and is executed on the RAM 326. It is possible to store a portion of the programs and data held in the HDD 328 into the ROM 324 and store a portion of the programs and data held in the ROM 324 into the HDD 328 as needed.

The operating unit 330 is an input means used by the user for executing text input, various settings, and various instructions (input) such as start instruction, and consists of, for example, a keyboard comprising a plurality of keys including ten keys for setting the number of copies to be made, a start key for instructing the start of an operation, a stop key for instruction the stop of an operation. The display unit 332 is an output means used for indicating to the user the configuration of the device, the progress of a print job, error occurrence status, settings that can be currently modified, etc., and consists of, for example, an LCD or a touch screen.

The print output unit 334 has an engine for forming an image on a sheet of paper as a recording medium using an image forming process such as an electronic photographing process containing electrostatic charging, exposure, development, transfer, and fixing process, and is used for printing the image data stored in the HDD 328 according to the instructions of the CPU 322. The printing (image forming) process is not limited to the embodiment of using the electronic photography process but rather the impact system, the thermal transfer system, and the ink jet system can also be suitably applied.

The communication interface 336 is a communication unit consisting of an extender (LAN board) that adds a communication function via the network 400 to the printing apparatus 300 (300A-300D), and is used to connect with the client terminal 200 or other printing apparatuses via the network 400 and execute the data sending/receiving.

Moreover, it is possible to use an own protocol, or an existing protocol, for example, FTP (File Transfer Protocol), SMB (Server Message Block), LPR (Line Printer Remote), and RAW (TCP/IP), as the data communication protocol among the printing apparatuses 300A-300D. Further, the printing apparatus that receives data can detect the receipt of data by setting the file path for the receipt of data in advance and monitoring the particular file path in case of FTP and SMB, and can detect the receipt of data based on the data receipt notice to be issued from hardware or OS in case of LPR and RAW.

Figure 4:
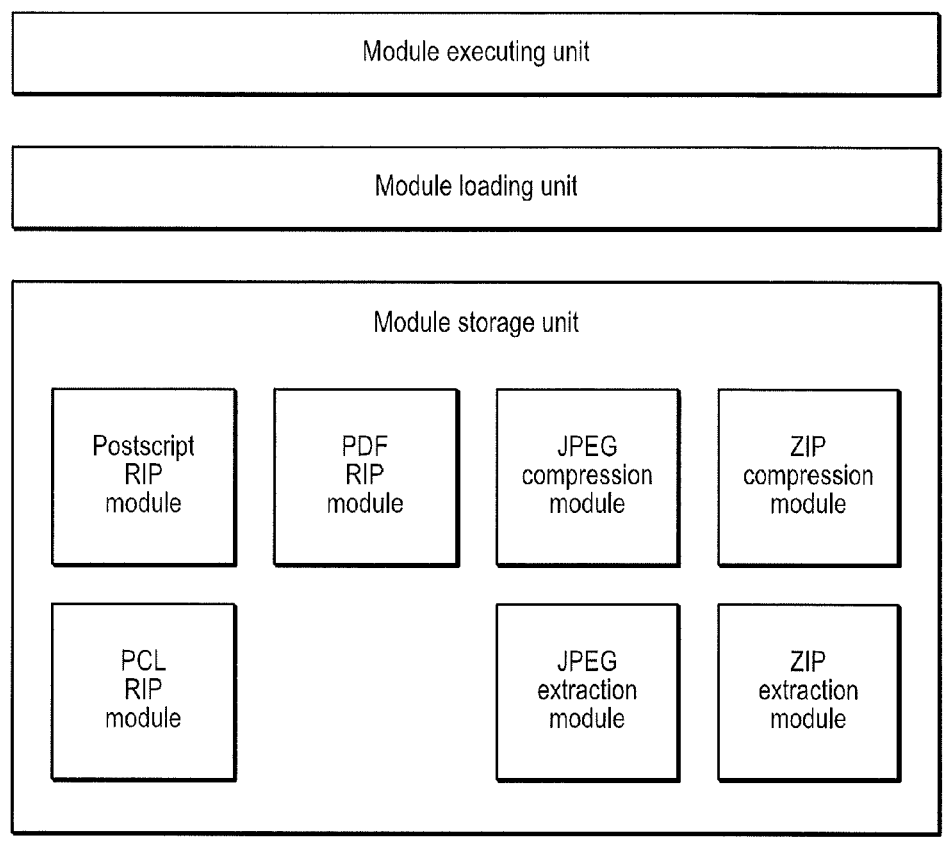
FIG. 4 is a block diagram for describing the processing program installed in the printing apparatus.

FIG. 4 is a block diagram for describing the processing program installed in the printing apparatus.

The processing program has a module storage unit for storing a module that executes various kinds of processes, a module loading unit for reading a module that is stored as needed, and a module executing unit for executing the module read in.

The modules stored in the module storage unit are, for example, Postscript RIP (Raster Image Processing) module, PCLRIP module, PDFRIP module, JPEG (Joint Photographic Experts Group) compression module, JPEG extraction module, ZIP compression module, and ZIP extraction module, and can be stored in HDD 328 as files, or stored in the ROM 324 as memory objects.

For example, if the module executing unit uses Java VM (Virtual Machine), the module consists of Java codes, and, if the module executing unit uses a Kernel provided by the OS, the module consists of an object obtained by compiling a program made in accordance with a programming language such as C language or Basic, or a shell script prepared by combining commands prepared in advance by the OS.

Next, the printing method according to the first embodiment is described below.

In the present method, if the transfer source printing apparatus is not in an idle status when it receives print data, the transfer source printing apparatus transmits to a transfer destination printing apparatus that is in an idle status the processing program and process data for executing the process of generating image data from the print data, requests it to execute said process, the output data generated from the process data by said process executed in the transfer destination printing apparatus is transmitted to the transfer source printing apparatus, and then the image data generated from the output data is printed in the transfer source apparatus.

Next, the operation of the transfer source device (transfer source printing apparatus) is described in detail. In the present embodiment, a case of the printing apparatus 300A receiving print data described in the Postscript (Registered Trademark) and compressed in the ZIP format, and the printing apparatus 300A becoming the transfer source device is assumed.

Figure 5B:
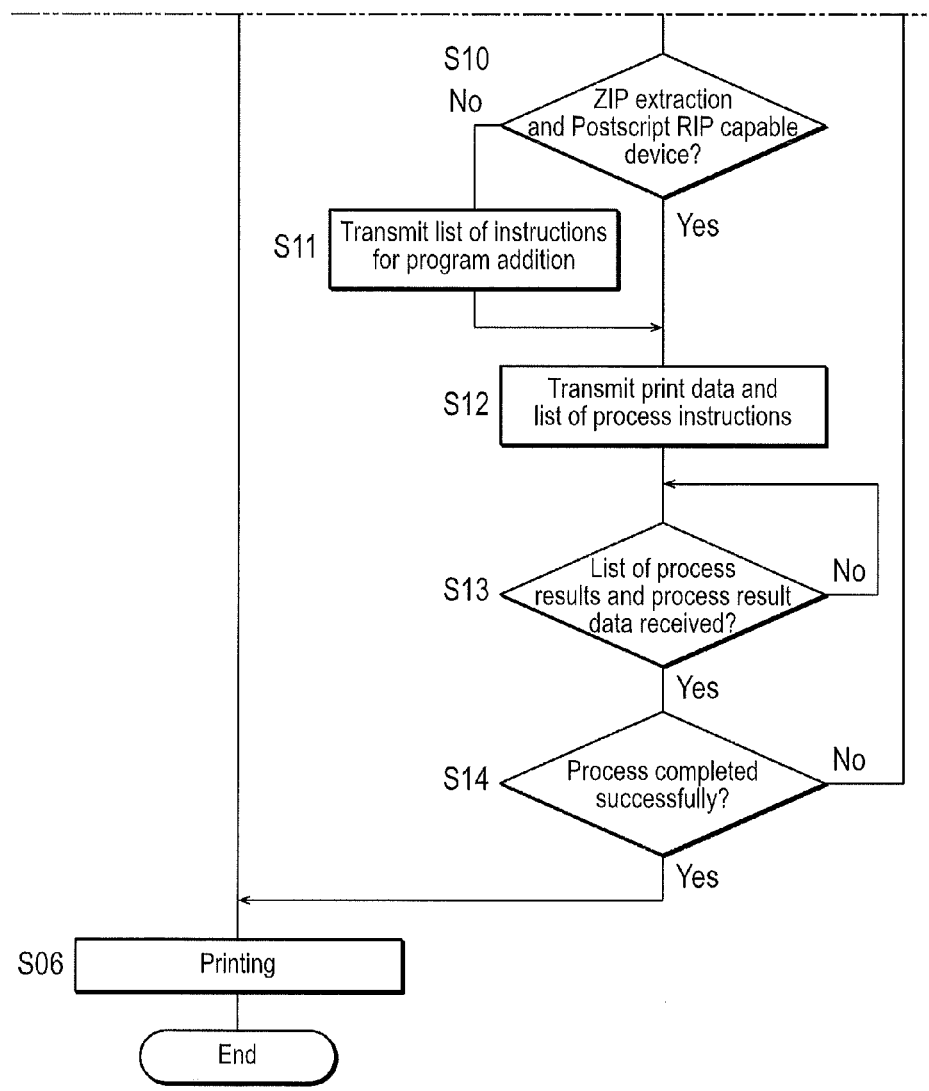
FIG. 5B is a flow chart for describing the steps that follow the process shown in FIG. 5A.

FIG. 5A and FIG. 5B represent a flow chart used for describing the operation of transfer source printing apparatus, FIG. 6 is a chart used for describing the list of functions described in steps S07 and S08, FIG. 7 is a chart used to describe another example list of functions, FIG. 8 is a chart used for describing the list of instructions for program addition shown in step S11 of FIG. 5B, FIG. 9 is a chart used for describing the list of process instructions shown in step S12 of FIG. 5B, and FIG. 10 is a chart used for describing the lists of process results shown in step S13 of FIG. 5B. Incidentally, the algorithm shown in the flowcharts of FIG. 5A and FIG. 5B is stored as a processing program in the HDD 328 and is executed by the CPU 322.

First, as the print data is received (step S01), the print data format is detected (step S02). The print data format is detected by analyzing the PJL (Printer Job Language) added to the print data, or the header portion of the print data. Moreover, it is also possible to detect the print data format by deciding a transfer rule in advance between the printer driver of the client terminal 200 and the printing apparatus.

The status of the job being executed at the own machine (printing apparatus 300A) is checked to see if it is in the idle status or not (step S03). If it is judged that it is in the idle status (step S03: Yes), the print data being ZIP-compressed (ZIP data) is extracted (step S04), the RIP (Postscript RIP) process for converting the PDL data to printable Raster data by the Postscript interpreter is executed (step S05), and the printing is executed using the particular raster data (step S06).

On the other hand, if an ongoing job exists, with the ZIP-extraction and other processes concerning the ongoing job are being executed, so that it is judged that the apparatus is not in the idle status (in the busy status) (step S03: No), a command requesting for the list of functions is transmitted to other printing apparatuses 300B-300D connected to the network 400 by multicasting (step S07). The mode of the transmission of the command requesting for the list of functions is not limited to multicasting.

The list of functions include, for example, the IP address of its own (printing apparatus 300A), the printing status, and executable process items, and is used for detecting whether the printing apparatuses 300B-300D connected to the network are idle or not, and whether there is a function for executing the intended processes exists or not. The printing status is either the idle status, or the busy status that shows that a printing job is in process. The executable process items include the ZIP compression, ZIP extraction, Postscript-format PDL RIP, PCL-format PDL RIP, PDF-format RIP, and JPG extraction.

Upon receiving a command requesting the list of functions, the printing apparatuses 300B-300D transmit the list of functions in the text format as shown in FIG. 6 to the printing apparatus 300A. The list of functions does not have to be limited to the text format, but rather can assume the XML format, or the binary data format predetermined among devices.

Upon receiving the list of functions (step S08), it analyzes the list of functions and judges whether or not there is any printing apparatus that is in the idle status (step S09). If no printing apparatus in the idle status is detected (step S09: No), the execution sequence returns to step S4 and executes ZIP extraction, Postscript RIP, and raster data printing on the own apparatus.

If a printing apparatus in the idle status is found (step S09: Yes), the particular printing apparatus is selected as the transfer destination apparatus, analyzes the list of functions, and detects whether or not ZIP extraction and Postscript RIP is executable or not (step S10). If both process are detected to be executable (step S10: Yes), the execution sequence advances to step S12. If it is detected that there is a non-executable process (insufficient processing program) (step S10: No), the list of instructions for program addition is transmitted to the transfer destination device (step S11), and the execution sequence advances to step S12.

The list of instructions for program addition consists of commands described in the XML format as shown in FIG. 8, showing one process instruction within a range surrounded by "Register" tags, in which there are "Process" tag, "Function" tag, "Data" tag, and "Delete" tag. "Process" tag shows the added processing program. "Function" tag specifies the processing program designated by the "Process" tag. "Data" tag shows the file name of the processing program transmitted from the transfer source device to the transfer destination device.

"Delete" tag defines the deletion timing of the processing program to be added. In other words, "Delete" tag is used for notifying the presence/absence of the deletion of the processing program to the transfer destination device after the execution of the process; for example, the value "Complete" indicates the deletion of the process after the execution, while "NONE" indicates that it is maintained continuously without deletion. The deletion of the processing program is executed, for example, based on the restriction existing in the license contact of a font. Moreover, "after the execution" here means after the transmission of the lists of process results and the list of process instructions to the transfer source device as described later is completed.

Therefore, in steps S09 through S11 according to the list of functions shown in FIG. 6, the printing apparatus 300C is in the busy status, and the printing apparatus 300D is in the idle status and cannot execute ZIP extraction and Postscript RIP processes while the printing apparatus 300B is in the idle status and can execute ZIP extraction and Postscript RIP possible, with no deficiency of processing programs and no need of transmitting the list of instructions for program addition, so that the printing apparatus 3003 is selected as the transfer destination device.

On the other hand, in case of the function of the list of functions shown in FIG. 7, the printing apparatus 300B and the printing apparatus 300C are in the busy status, and the printing apparatus 300D is in the idle status, so that the printing apparatus 300D is selected as the transfer destination apparatus, while ZIP extraction and Postscript RIP are made possible by transmitting the list of instructions for program addition to the printing apparatus 300D though the printing apparatus 300D does not have the ZIP extraction and Postscript RIP functions.

In step S12, the print data and the list of process instructions are transmitted to the transfer destination device, and the transfer destination device applies various processes to the print data based on the contents of the list of process instructions and transmits the lists of process results and the process result data (output data) to the transfer source device.

The list of process instructions consists of commands described in the XML format as shown in FIG. 9, showing one process instruction within a range surrounded by "Request" tags, in which there are "Data" tag, "Process" tag, "Function" tag, and "Reply" tag. "Data" tag shows the file name of the print data transmitted from the transfer source device to the transfer destination device. "Process" tag shows the process content to be executed by the transfer destination device, and if the number of "Process" tag becomes "END," it means that the process is the last process. "Function" tag specifies the contents of process shown by "Process" tag, and the input data is specified by "Input" tag and the process result data is specified by "Output" tag. "Reply" tag specifies the transfer source device to which the lists of process results and the process result data are transmitted (returned).

The lists of process results consists of commands described in the XML format as shown in FIG. 10, showing one process result within a range surrounded by "Report" tags, in which range exist "Machine" tag, "Process" tag, "Function" tag, "Result" tag, and "Data" tag. "Machine" tag shows the IP address of the transfer destination device which executed the process. "Process" tag shows the process contents requested by the transfer source device. "Function" tag specifies the processing program designated by the "Process" tag. "Result" tag shows the process result (successful completion or error). "Data" tag shows the process result data.

Then, a judgment is made as to whether or not the lists of process results and process result data are received from the transfer destination device (step S13). If it is judged that the lists of process results and process result data are received (step S13: Yes), the lists of process results is analyzed to make a judgment as to whether or not the process at the transfer destination device is completed successfully (step S14).

If the process at the transfer destination device is completed successfully (step S14: Yes), printing is executed using the process result data (step S06). If it is judged that an error occurred in the process at the transfer destination device (step S14: No), the execution sequence returns to step S03.

Next, the operation of the transfer destination device (transfer destination printing apparatus) is described.

Figure 11:
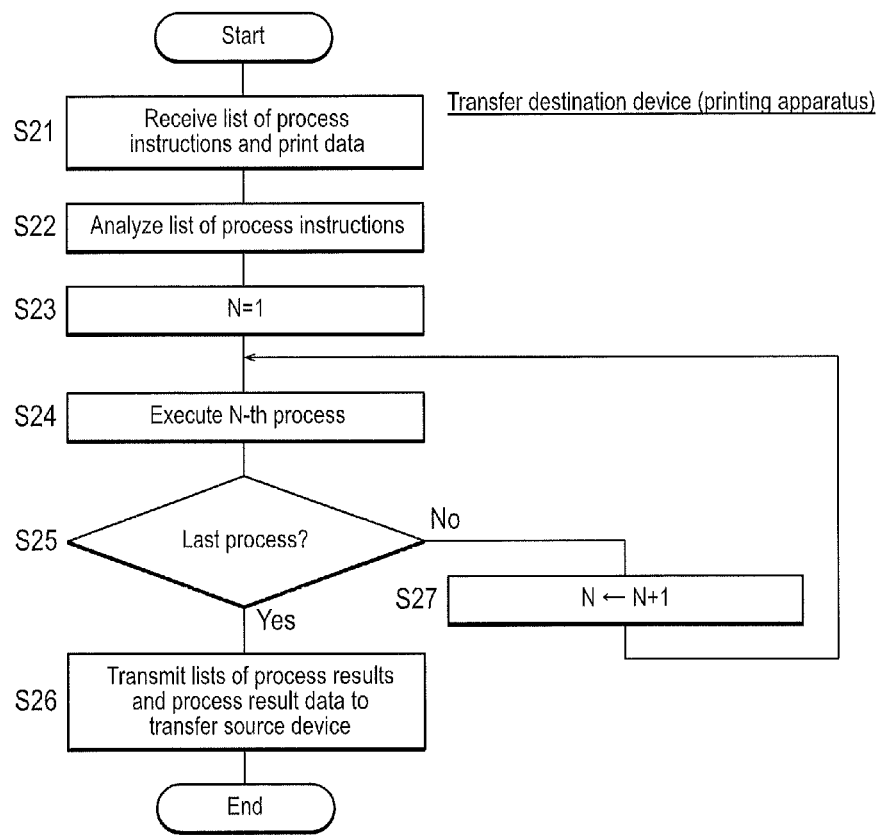
FIG. 11 is a flowchart for describing the operation of a transfer destination printing apparatus when there is no transmission of the list of instructions for program addition.

FIG. 11 is a flowchart for describing the operation of a transfer destination printing apparatus when there is no transmission of the list of instructions for program addition. The algorithm shown in the flowchart of FIG. 11 is stored as a processing program in the HDD 328 and is executed by the CPU 322.

When the printing apparatus 300B, which has no shortage of processing program, receives the list of process instructions and the print data from the printing apparatus 300A, which is the transfer source device (step S21), the print data is stored at the HDD 328 or the RAM 326, and the list of process instructions is analyzed (step S22). The parameter N is substituted with "1" (step S23) and the N-th process specified by "Process" tag of the list of process instructions is executed (step S24).

Next, a judgment is made as to whether or not the N-th process is the last process (step S25). If it is judged that the number of the next "Process" tag is "END" and, thus, the N-th process is the last process (step S25: Yes), the lists of process results and the process result data are transmitted (returned) to the printing apparatus 300A specified by "Replay" tag of the list of process instructions (step S26).

If it is judged that the N-th process is not the last process (step S25: No), "1" is added to the parameter N (step S27), and the execution sequence returns to step S24 to execute the remaining processes.

Figure 12:
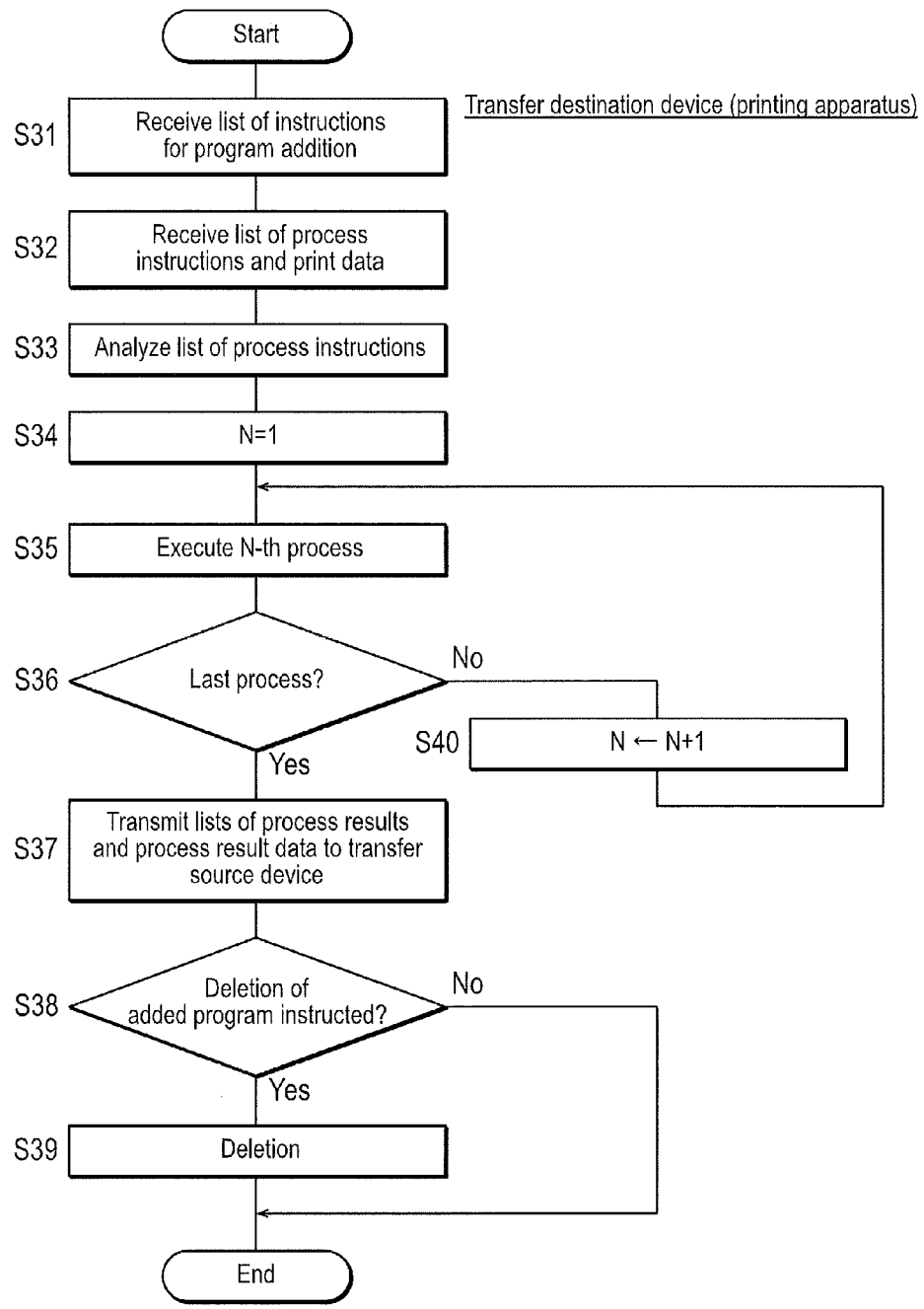
FIG. 12 is a flowchart for describing the operation of a transfer destination printing apparatus when there is a transmission of the list of instructions for program addition.

FIG. 12 is a flowchart for describing the operation of a transfer destination printing apparatus when there is a transmission of the list of instructions for program addition. The algorithm shown in the flowchart of FIG. 12 is stored as a processing program in the HDD 328 and is executed by the CPU 322.

First, as the printing apparatus 300 D, where the shortage of processing program exists, receives the list of instructions for program addition from the printing apparatus 300A, the list of instructions for program addition is analyzed, and the processing program is correlated with the function and the deletion timing and maintained (step S31). For example, if the list of instructions for program addition shown in FIG. 8 is received, ZIP extraction and Postscript RIP become executable by the added program.

When the list of process instructions and the print data are received from the printing apparatus 300A (step S32), the print data is stored at the HDD 328 or the RAM 326, and the list of process instructions is analyzed (step S33). The parameter N is substituted with "1" (step S34), and the N-th process specified by "Process" tag of the list of process instructions is executed (step S35).

Next, a judgment is made as to whether or not the N-th process is the last process (step S36). If it is judged that the number of the next "Process" tag is "END" and, thus, the N-th process is the last process (step S36: Yes), the lists of process results and the process result data are transmitted (returned) to the printing apparatus 300A specified by "Replay" tag of the list of process instructions (step S37).

After that, a judgment is made as to whether the deletion of the added program is requested or not (step S38). If "NONE" is specified to "Delete" tag of list of instructions for program addition (step S38: No), the added program is not deleted; if, on the other hand, "NONE" is not specified (step S38: Yes), the added program is deleted (step S39). On the other hand, if it is judged that the N-th process is not the last process (step S36: No), "1" is added to the parameter N (step S40), and the execution sequence returns to step S35 to execute the remaining processes.

As can be seen in the above, in the first embodiment, the transfer source printing apparatus 300A consisting of the first printing apparatus that receives print data transmits the process data and the processing program for executing the process of generating image data from the print data to the transfer destination printing apparatus in the idle status and requests the execution of said process when it is not in the idle status when it receives the print data. In other words, the process can be executed by the transfer destination printing apparatus, which is in an idle status, when the transfer source printing apparatus 300A is not in an idle status, so that it does not affect the resources (memory distributions on the CPU and RAM, etc.) that are currently used for executing the process at the transfer source printing apparatus 300A, thus improving the process efficiency as a whole system. Moreover, the processing program is not transmitted if the transfer destination printing apparatus consists of the printing apparatus 300B that has a function of executing the process, but the processing program is transmitted from transfer source printing apparatus 300A if the transfer destination printing apparatus consists of the printing apparatus 300D that lacks the processing program. Consequently, the transfer destination printing apparatus does not have to have the same function as transfer source printing apparatus 300A, so that the degree of freedom in selecting the transfer destination is larger. Moreover, since the final printing process is executed at the transfer source printing apparatus 300A, there is no need to consider the color reproduction range of the transfer destination printing apparatus. Therefore, it provides a printing system, a printing apparatus, a printing method, and a printing program that provides a better freedom in selecting the transfer destination and are capable of improving the process efficiency as the entire system.

Next, let us describe the second embodiment. Incidentally, it is assumed that non-compressed print data described in the PDF format is received by the printing apparatus 300A from the client terminal 200 in the present embodiment.

Figure 13A:
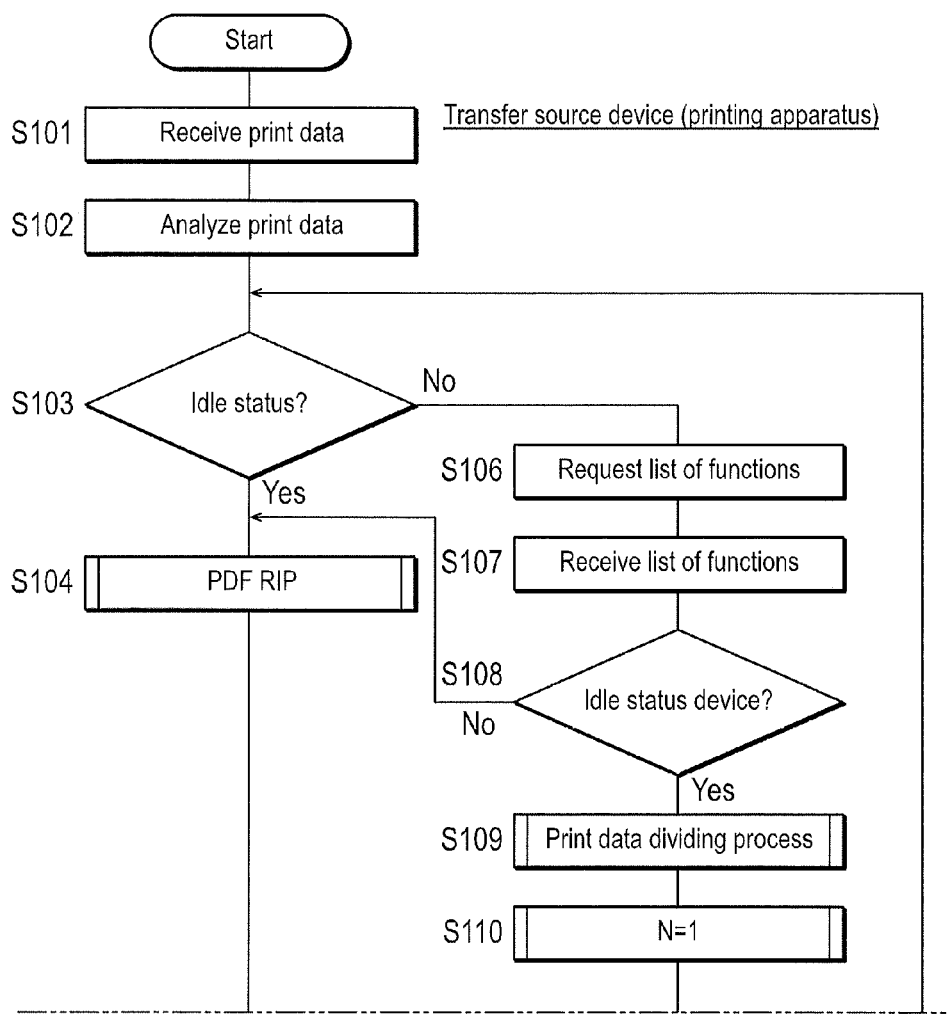
FIG. 13A is a flowchart for describing the second embodiment showing the operation of the transfer source printing apparatus.
Figure 13B:
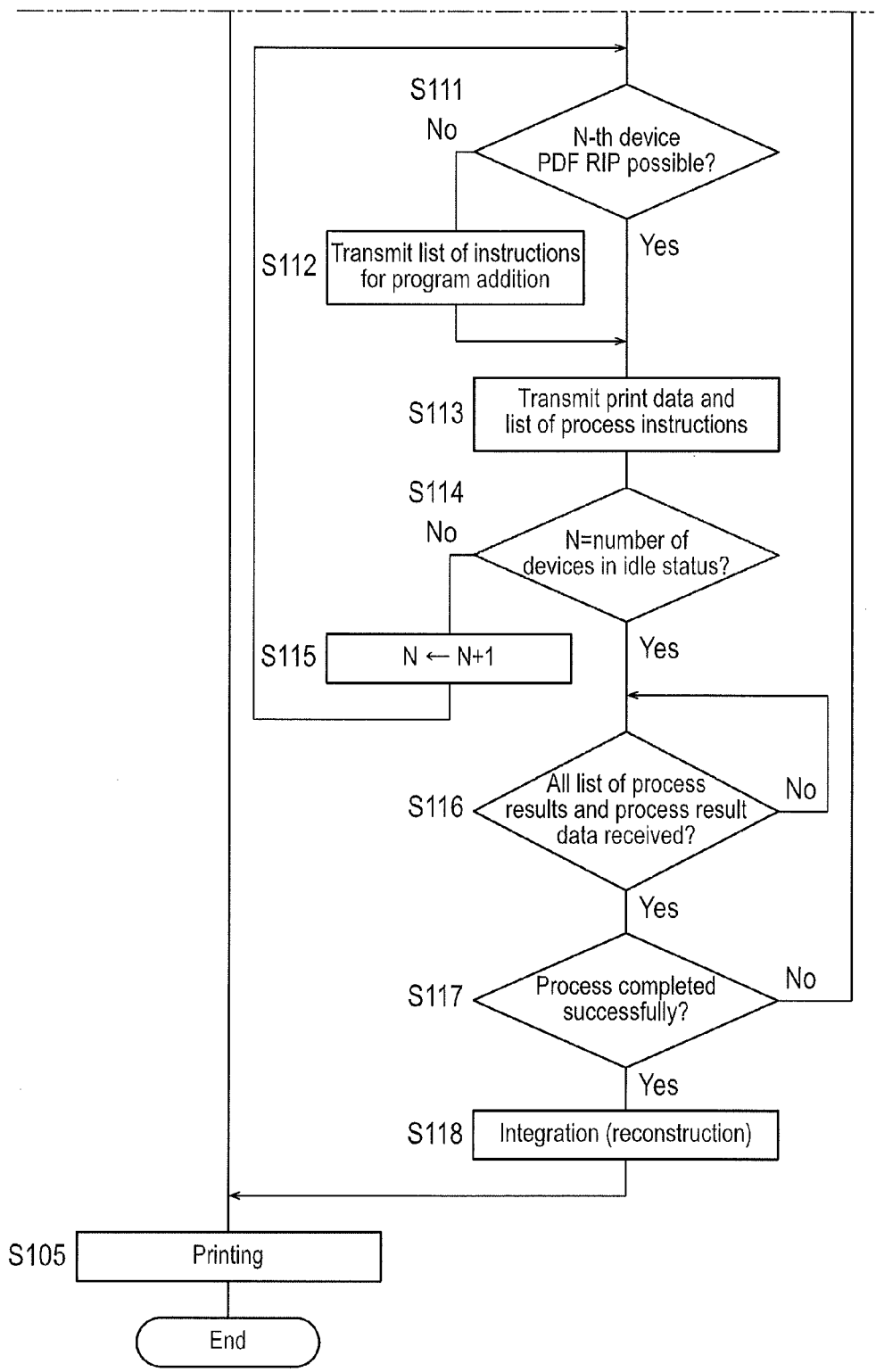
FIG. 13B is a flow chart for describing the steps that follow the process shown in FIG. 13A.

FIG. 13A and FIG. 13B represent the flow chart for describing the second embodiment, showing the operation of transfer source printing apparatus, while FIG. 14 is a chart for describing the list of functions in the second embodiment. Incidentally, the algorithm shown in the flowcharts of FIG. 13A and FIG. 13B is stored as a processing program in the HDD 328 and is executed by the CPU 322.

The second embodiment is different from the first embodiment in that the former divides the print data and processes the divided print data by a plurality of transfer destination apparatuses in parallel, while the latter processes the print data by a single transfer destination apparatus as a general thing.

In more detail, upon receiving print data (step S101), the printing apparatus 300A, which is transfer source printing apparatus, detects the print data format (step S102), checks the job status being executed on its own, and makes a decision if it is in the idle status or not (step S103).

If it is judged that the apparatus is in the idle status (step S103: Yes), the RIP (PDFRIP) of converting PDF data to printable raster data is executed (step S104), and printing is executed using the particular raster data (step S105).

On the other hand, if an ongoing job exists, with the processes concerning the ongoing job are being executed, so that it is judged that the apparatus is not in the idle status (in the busy status) (step S103: No), a command requesting for the list of functions is transmitted to other printing apparatuses 300B-300D connected to the network 400 by multicasting (step S106).

Upon receiving the list of functions (step S107), it analyzes the list of functions and makes a judgment as to whether or not there is any printing apparatus that is in the idle status (step S108).

If it is judged that there is no printing apparatus in the idle status (step S108: No), the execution sequence returns to step S104 and executes PDFRIP and raster data printing on the own apparatus.

If it is judged that the printing apparatus in the idle status exists (step S108: Yes), the particular printing apparatus is selected as the transfer destination apparatus, the print data dividing process is executed, and "1" is substituted in the parameter N (step S110). The print data dividing process is a process of dividing (segmentalizing) print data into smaller parts, so that the divided print data can be processed among a plurality of transfer destination apparatuses in parallel, and its divisional configuration is kept in the transfer source device for integration to be described later. In the present embodiment, the PDF data is divided into two parts by pages.

A judgment is made as to whether or not PDFRIP is executable at the N-th transfer destination device (step S111). If PDFRIP is judged to be executable (step S111: Yes), the execution sequence advances to step S113. If it is judged that PDFRIP is not executable (there is insufficient processing program) (step S111: No), the list of instructions for program addition is transmitted to the N-th transfer destination device (step S112), and the execution sequence advances to step S113.

In step S113, the print data and the list of process instructions are transmitted to the N-th transfer destination device, and the transfer destination device applies various processes to the print data based on the contents of the list of process instructions and transmits the lists of process results and the process result data (output data) to the transfer source device.

Then, a judgment is made as to whether the parameter N matches with the number of the selected transfer destination devices (step S114).

If it is judged that the parameter N does not match with the number of the selected transfer destination devices (step S114: No), "1" is added to the parameter N (step S115), and the execution sequence returns to step S111 to execute the remaining processes concerning the transfer destination devices.

Therefore, in case of the list of functions shown in FIG. 14, the printing apparatus 300C is in the busy status, while the printing apparatuses 300B and 300D are in the idle status, so that the printing apparatuses 300B and 300D are selected as the transfer devices in steps S108-S115, and the PDF data is divided into two parts. Also, the list of instructions for program addition is transmitted to the printing apparatus 300B since it does not have PDFRIP function, while the list of instructions for program addition is not transmitted to the printing apparatus 300D since it is capable of executing PDFRIP.

If it is judged that the parameter N matches with the number of the transfer destination devices (step S114: Yes), a judgment is made as to whether or not the lists of process results and the process result data from all the transfer destination devices are received (step S116).

If it is judged that all the lists of process results and process result data are received (step S113: Yes), each of the lists of process results is analyzed to make a judgment as to whether or not the process at the transfer destination apparatus is completed successfully (step S117).

If the process at each transfer destination apparatus is completed successfully (step S117: Yes), the process result data is integrated (reconstructed) (step S118) based on the divisional configuration kept in the print data dividing process (refer to step S109), and printing is executed (step S105). If it is judged that an error occurred in the process at the transfer destination device (step S117: No), the execution sequence returns to step S103.

Since the operations of the transfer destination device is identical to those in case of the first embodiment, the description is omitted here in order to avoid duplications.

As can be seen from the above, the process of generating the image data from the print data consists of a plurality of parallel processes (PDFRIP) that are executable in parallel, the process data is divided corresponding to a plurality of parallel processes, the transfer destination printing apparatuses consist of a plurality of transfer destination apparatuses 300B and 300D, the parallel process is applied to each of the transfer destination printing apparatuses 300B and 300D to which the divided process data is applied, and the transfer source printing apparatus 300A has a integrating unit that integrates a plurality of output data transferred from the plurality of transfer destination printing apparatuses 300B and 300D. In other words, the second embodiment makes it easy to improve the process efficiency as the entire system in case when the process of generating image data from print data consists of a plurality of parallel process that are executable in parallel.

Next, let us describe the third embodiment. It is assumed that the printing apparatus 300A receives print data described in the PDF format and compressed in the ZIP format from the client terminal 200 in the present embodiment.

FIG. 15 is a chart for describing the list of functions according to the third embodiment and FIG. 16 is a chart for describing the list of process instructions according to the third embodiment.

The third embodiment is different from the first embodiment in that the former segmentalizes (divides) the process related to print data into a plurality of sequential processes to be sequentially processed and the divided processes are executed by a plurality of transfer destination apparatuses sequentially, while the latter processes the print data by a single transfer destination apparatus, as a general thing.

For example, when the printing apparatus 300A, which is the transfer source device, receives the list of functions shown in FIG. 15, although both the printing apparatus 300B and the printing apparatus 300D are in the idle status, the printing apparatus 300B is capable of executing ZIP extraction but not PDFRIP, while the printing apparatus 300D is capable executing PDFRIP but not ZIP extraction. Therefore, the printing apparatuses 300B and 300D are selected as the transfer destination devices in the present embodiment, ZIP extraction of the print data is executed in the printing apparatus 300 B, and PDFRIP of the extracted print data is executed in the printing apparatus 300D, the transmission of the list of instructions for program addition (see FIG. 8) is not necessary.

In this case, the transfer source printing apparatus 300A determines the process sequential order at the transfer destination printing apparatuses 300B and 300D, and transmits the print data and the list of process instructions to the transfer destination printing apparatus 300B that is to execute the first process (ZIP extraction). The list of process instructions includes, as shown in FIG. 16, the IP address and the process content of transfer destination printing apparatus 300D that executes the next process (PDFRIP) in addition to the IP address and the process content of the transfer destination apparatus 300B. In other words, the list of process instructions is used for notifying the determined process sequential order to the transfer destination device and each of the transfer destination devices executes the corresponding sequential process in accordance with the determined process sequential order.

Next, the operation of the printing apparatus 300B, which is the primary transfer destination device (first transfer destination device).

Figure 17:
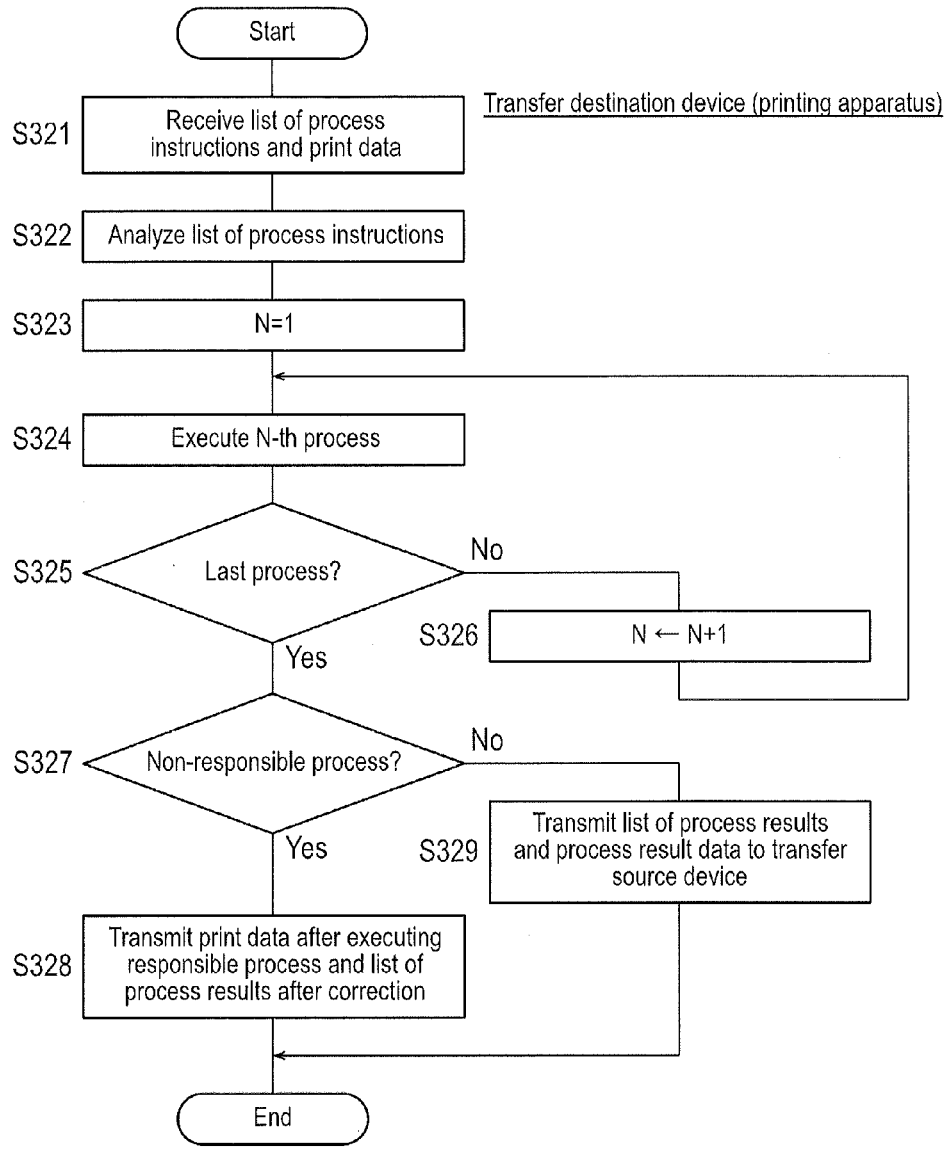
FIG. 17 is a flowchart for describing the operation of the transfer destination printing apparatus according to the third embodiment of the present invention.

FIG. 17 is a flowchart for describing the operation of the transfer destination printing apparatus according to the third embodiment, and FIG. 18 is a chart for describing the list of process instructions after correction shown in step 328 of FIG. 17. The algorithm shown in the flowchart of FIG. 17 is stored as a processing program in the HDD 328 and is executed by the CPU 322.

First of all, when the list of process instructions and the print data are received from the printing apparatus 300A, which is the transfer source device (step S321), the print data is stored at the HDD 328 or the RAM 326, and the list of process instructions (see FIG. 16) is analyzed (step S322).

Then, "1" is substituted into the parameter N (step S323), and the N-th process (ZIP extraction process) designated in "Process" tag of the list of process instructions, "Location" tag of which describes the IP address identical to the IP address of own apparatus (printing apparatus 300A) is executed (step S324).

Next, a judgment is made as to whether or not the N-th process is the last process (step S325). If it is judged that the N-th process is not the last process (step S325: No), "1" is added to the parameter N (step S326), and the execution sequence returns to step S324 to execute the remaining processes.

If the number of the next "Process" tag is "END" so that the N-th process is the last process (step S325: Yes), a judgment is made as to whether the process that the own apparatus is responsible for exists or not (step S327).

If it is judged that anon-responsible process exists as the IP address described on "Location" tag of "Process=END" is different from the IP address of the own apparatus (step S327: Yes), the print data after the responsible process is executed and the list of process instructions after correction are transmitted to the printing apparatus 300D, which is the secondary transfer destination device (second transfer destination device) shown in the above-mentioned "Location" tag. The correction of the list of process instructions is made by deleting the "Process" tag portion completed in the own apparatus, and designating the process result of the process executed by the own apparatus on "Data" tag to be transmitted as shown in FIG. 18.

On the other hand, if it is judged that no non-responsible process (process for which other printing apparatus is responsible) exists (step S327: No), the lists of process results and the process result data are transmitted (returned) to the transfer source device (printing apparatus 300A) specified by "Replay" tag of the list of process instructions (step S328).

Next, the operation of the printing apparatus 300D which is the secondary transfer destination device is described. Moreover, a case of the printing apparatus 300D turning from the idle status to the busy status during the process of the printing apparatus 300B, which is the primary transfer destination device, is considered as well.

Figure 19A:
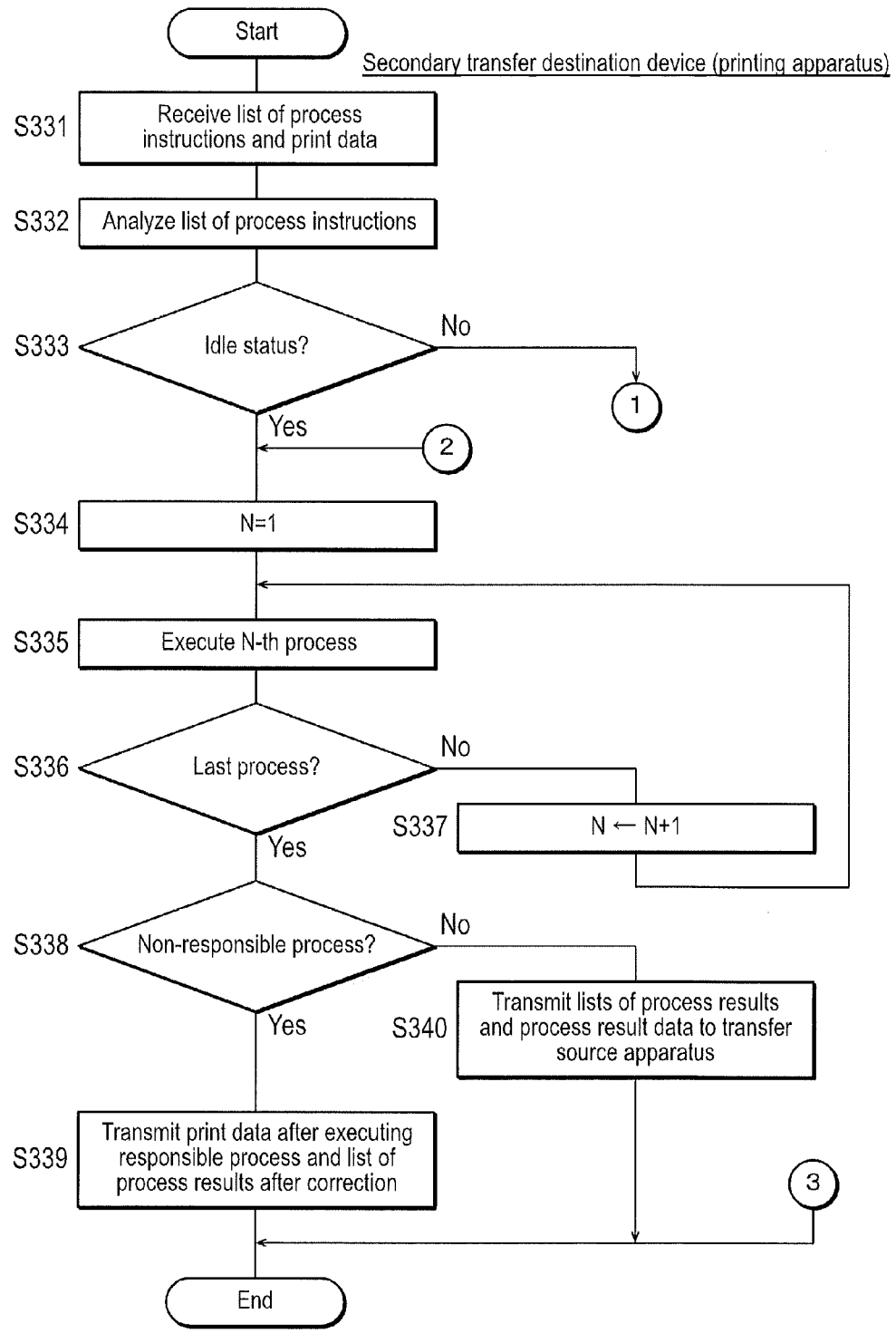
FIG. 19A is a flowchart for describing the operation of the secondary transfer destination printing apparatus according to the third embodiment of the present invention.

FIG. 19A and FIG. 19B constitute a flowchart for describing the operation of the secondary transfer destination printing apparatus according to the third embodiment of the present invention, FIG. 20 is a chart for describing the list of functions shown in step S342 of FIG. 19B, and FIG. 21 is a chart for describing the list of process instructions after correction shown in step S346 of FIG. 19B. The algorithm shown in the flowcharts of FIG. 19A and FIG. 19B is stored as a program in the HDD 328 and is executed by the CPU 322.

First of all, when the list of process instructions and the print data are received from the printing apparatus 300A, which is the transfer source device (step S331), the print data is stored at the HDD 328 or the RAM 326, and the list of process instructions (see FIG. 16) is analyzed (step S332).

The status of the job being executed at the own apparatus is checked to see if it is in the idle status or not (step S333).

If it is judged to be in the idle status (step S333: Yes), steps S334-S340 corresponding to steps S323-S329 of FIG. 17 are executed similar to the case of the printing apparatus 300B, which is the primary transfer destination device.

On the other hand, if an ongoing job exists, with the ZIP-extraction and other processes concerning the ongoing job are being executed, so that it is judged that the apparatus is in the busy status (step S333: No), a command requesting for the list of functions is transmitted to other printing apparatuses 300A-300C connected to the network 400 by multicasting (step S341).

Upon receiving the list of functions (see FIG. 20) (step S342), it analyzes the list of functions and makes a judgment as to whether or not there is any printing apparatus that is in the idle status (step S343). If it is judged that there is no printing apparatus in the idle status (step S343: No), the execution sequence returns to step S334.

If it is judged that the printing apparatus in the idle status does exist (step S343: Yes), the particular printing apparatus is selected as the tertiary transfer destination apparatus (third transfer destination device), and a judgment is made as to whether or not the unprocessed process of the own apparatus (PDFRIP) is executable (step S344). If it is judged to be executable (step S344: Yes), the execution sequence advances to step S346. If it is judged that there is a non-executable process (insufficient processing program) (step S345: No), the list of instructions for program addition is transmitted to the tertiary transfer destination device (step S345), and the execution sequence advances to step S346.

In step S346, the output data and the list of process instructions corrected in such a way that the IP address of "Location" tag matches with the tertiary transfer destination device (see FIG. 21) are transmitted to the tertiary transfer destination device, and the tertiary transfer destination device applies various processes to the received output data based on the contents of the list of process instructions, and transmits the lists of process results and the process result data (output data) to the transfer source device.

As can be seen from the above, in the third embodiment, the process for generating image data from print data consists of a plurality of sequential processes (ZIP extraction and PDFRIP) executed sequentially, the processing program consists of a plurality of processing programs corresponding to of a plurality of sequential processes, the transfer destination printing apparatus consists of a plurality of transfer destination printing apparatuses 300B and 300D corresponding to of a plurality of sequential processes, the transfer destination printing apparatus 300B that executes the first sequential process (ZIP extraction) receives the process data from the transfer source printing apparatus 300A, and the transfer destination printing apparatus 300D that executes the last sequential process (PDFRIP) transmits the output data to the transfer source printing device. In other words, the third embodiment makes it easy to improve the process efficiency as the entire system in case when the process of generating image data from print data consists of a plurality of sequential processes that are executable in sequence.

The present invention shall not be construed to be limited by the embodiment described above but rather it can be modified in a various way within the claims.

For example, the process of generating image data from print data is not limited to extraction or RIP but other process such as color conversion and lookup table preparation can be applied as well.

Moreover, it is also possible to provide in the transfer source printing apparatus: a data transmission setting means so that it can be constituted in such a way as to allow the user to instruct whether process data is to be transmitted or not to cause the transfer source printing apparatus to execute all the process on its own after completing the ongoing job when the setting of transmitting no process data is made; as well as a program transmission setting means so that it can be constituted in such a way as to allow the user to instruct whether the processing program is to be transmitted or not to cause the transfer source printing apparatus to select a transfer destination printing apparatus among printing apparatuses that can execute the process without the transmission of the processing program when the setting of no transmission is made. Moreover, it is also possible to constitute in such a way as to allow the transfer destination printing apparatus to cause another printing apparatus to do the requested process if a process with a priority higher than the requested job exists.

Also, the means, method, and program associated with the present invention cab be realized by a dedicated hardware circuit. Moreover, in case when the present invention is to be materialized using programmed printing apparatuses (transfer destination printing apparatus and transfer source printing apparatus), the program that operates the printing apparatus can be provided on-line via a network such as the Internet without using a recording medium, rather than by a computer readable recording medium such as a USB memory, a CD-ROM (Compact Disc Read Only Memory), etc. In such a case, the program is typically transmitted to and stored in a random access storage device such as a hard disk of the printing apparatus. Also, the above program can be either provided as independent application software or can be built into the software of the printing apparatus as one of its function.

What is claimed is:

1. A printing system comprising a plurality of printing apparatuses connected with each other via a network including a transfer source printing apparatus that receives print data and a transfer destination printing apparatus, wherein said transfer source printing apparatus comprises a process instruction unit for transmitting to said transfer destination printing apparatus in an idle status a processing program and process data for executing a process of generating image data from said print data, and requesting said process to be executed, when said transfer source printing apparatus is not in an idle status when it receives said print data;

said transfer destination printing apparatus comprises a transmitting unit for transmitting to said transfer source printing apparatus output data generated from said process data by said process;

said transfer source printing apparatus comprises a receiving unit for receiving said output data, and a printing unit for printing said image data generated from said output data received;

wherein:

said process for generating said image data from said print data comprises a plurality of parallel processes that are executable in a parallel manner;

said processing program comprises a plurality of processing programs corresponding to said plurality of parallel processes;

said process data is divided into parts corresponding to said plurality of parallel processes;

said transfer destination printing apparatus comprises a plurality of transfer destination printing apparatuses corresponding to said plurality of parallel processes; and said plurality of transfer destination printing apparatuses respectively execute the parallel processes to what divided said process data are applied; and said transfer source printing apparatus comprises a integrating unit for integrating a plurality of output data transmitted from said plurality of transfer destination printing apparatuses.

2. The printing system as claimed in claim 1, wherein said transfer source printing apparatus further comprises:

a status detection unit for detecting the presence or lack of an idling status in said printing apparatus connected via said network; and an apparatus selection unit for selecting said transfer destination printing apparatus from said printing apparatus that is detected to be in the idle status.

3. The printing system as claimed in claim 1, wherein said transfer source printing apparatus further comprises a function detection unit for detecting the presence or lack of a function for executing said process at said printing apparatus connected via said network; and said process instruction unit of said transfer source printing apparatus does not transmit said processing program when said selected transfer destination printing apparatus holds said function.

4. The printing system as claimed in claim 1, wherein said process for generating said image data from said print data comprises a plurality of processes;

said processing program comprises a plurality of processing programs corresponding to said plurality of processes; and said plurality of processes are executed at said transfer destination printing apparatus.

5. The printing system as claimed in claim 1, wherein said transfer destination printing apparatus holds said processing program transmitted from said transfer source printing apparatus after the execution of said process.

6. The printing system as claimed in claim 1, wherein said transfer destination printing apparatus deletes said processing program transmitted from said transfer source printing apparatus after the execution of said process.

7. The printing system as claimed in claim 1, wherein said transfer source printing apparatus further comprises a deletion instruction unit for notifying deletion of said processing program or not after the execution of said process to said transfer destination printing apparatus; and said transfer destination printing apparatus deletes said processing program according to the notice of deletion by said deletion instruction unit.

8. The printing system as claimed in claim 1, wherein the transfer source printing apparatus consists of a first printing apparatus that receives print data and the transfer destination printing apparatus consists of a second printing apparatus.

9. A printing system comprising a plurality of printing apparatuses connected with each other via a network including a transfer source printing apparatus that receives print data and a transfer destination printing apparatus, wherein said transfer source printing apparatus comprises a process instruction unit for transmitting to said transfer destination printing apparatus in an idle status a processing program and process data for executing a process of generating image data from said print data, and requesting said process to be executed, when said transfer source printing apparatus is not in an idle status when it receives said print data;

said transfer destination printing apparatus comprises a transmitting unit for transmitting to said transfer source printing apparatus output data generated from said process data by said process;

said transfer source printing apparatus comprises a receiving unit for receiving said output data, and a printing unit for printing said image data generated from said output data received;

wherein said process for generating said image data from said print data comprises a plurality of sequential processes that are executable in a sequential manner;

said processing program comprises a plurality of processing programs corresponding to said plurality of sequential processes; and said transfer destination printing apparatus comprises a plurality of transfer destination printing apparatuses corresponding to said plurality of sequential processes; and the transfer destination printing apparatus that executes the first sequential process receives said process data from said transfer source printing apparatus, and the transfer destination printing apparatus that executes the last sequential process transmits said output data to said transfer source printing apparatus.

10. The printing system as claimed in claim 9, wherein said transfer source printing apparatus further comprises a sequential order determination unit for determining a process sequential order of a plurality of transfer destination printing apparatuses, and a sequential order instruction unit for notifying the determined process sequential order to said plurality of transfer destination printing apparatuses; and each of said plurality of transfer destination printing apparatuses executes the sequential process in accordance with the determined process sequential order.

11. The printing system as claimed in claim 9, wherein the transfer source printing apparatus consists of a first printing apparatus that receives print data and the transfer destination printing apparatus consists of a second printing apparatus.

12. A printing method applied to a printing system comprising a plurality of printing apparatuses connected with each other via a network including a transfer source printing apparatus that receives print data and a transfer destination printing apparatus, the printing method comprising the steps of:

requesting said process to be executed when said transfer source printing apparatus is not in an idle status when it receives said print data after transmitting from transfer source printing apparatus to said transfer destination printing apparatus in an idle status a processing program and process data for executing a process of generating image data from said print data;

transmitting to said transfer source printing apparatus the output data generated from said process data by said process executed in said transfer destination printing apparatus;

receiving said output data in said transfer source printing apparatus; and printing said image data generated from said output data received in said transfer source printing apparatus;

wherein said process for generating said image data from said print data comprises a plurality of parallel processes that are executable in a parallel manner;

said processing program comprises a plurality of processing programs corresponding to said plurality of parallel processes;

said process data is divided into parts corresponding to said plurality of parallel processes;

said transfer destination printing apparatus comprises a plurality of transfer destination printing apparatuses corresponding to said plurality of parallel processes;

said plurality of transfer destination printing apparatuses respectively execute the parallel processes to what divided said process data are applied; wherein the printing method further comprises the step of integrating said plurality pieces of output data transmitted from said plurality of transfer destination printing apparatuses by means of said transfer source printing apparatus.

13. The printing method as claimed in claim 12, further comprising the steps of:

detecting the presence or lack of an idling status in said printing apparatus connected via said network by means of said transfer source printing apparatus; and selecting said transfer destination printing apparatus among said printing apparatuses detected as one which is in an idling status by means of said transfer source printing apparatus.

14. The printing method as claimed in claim 12, further comprising the step of detecting the presence or lack of a function for executing said process at said printing apparatus connected via said network by means of said transfer source printing apparatus, wherein said processing program is not transmitted in said requesting step when said selected transfer destination printing apparatus holds said function.

15. The printing method as claimed in claim 12, wherein said process for generating said image data from said print data comprises a plurality of processes;

said processing program comprises a plurality of processing programs corresponding to said plurality of processes; and said plurality of processes are executed at said transfer destination printing apparatuses.

16. The printing method as claimed in claim 12 further comprising the step of holding continuously said processing program transmitted from said transfer source printing apparatus even after the execution of said process by means of said transfer destination printing apparatus.

17. The printing method as claimed in claim 12 further comprising the step of deleting said processing program transmitted from said transfer source printing apparatus after the execution of said process by means of said transfer destination printing apparatus.

18. The printing method as claimed in claim 12 further comprising the steps of:

notifying deletion of said processing program or not after the execution of said process to said transfer destination printing apparatus by means of said transfer source printing apparatus; and deleting said processing program according to the notice of deletion in said notifying step by means of said transfer destination printing apparatus.

19. A printing method applied to a printing system comprising a plurality of printing apparatuses connected with each other via a network including a transfer source printing apparatus that receives print data and a transfer destination printing apparatus, the printing method comprising the steps of:

requesting said process to be executed when said transfer source printing apparatus is not in an idle status when it receives said print data after transmitting from transfer source printing apparatus to said transfer destination printing apparatus in an idle status a processing program and process data for executing a process of generating image data from said print data;

transmitting to said transfer source printing apparatus the output data generated from said process data by said process executed in said transfer destination printing apparatus;

receiving said output data in said transfer source printing apparatus; and printing said image data generated from said output data received in said transfer source printing apparatus;

wherein said process for generating said image data from said print data comprises a plurality of sequential processes that are executable in a sequential manner;

said processing program comprises a plurality of processing programs corresponding to said plurality of sequential processes;

said transfer destination printing apparatus comprises a plurality of transfer destination printing apparatuses corresponding to said plurality of sequential processes; and the transfer destination printing apparatus that executes the first sequential process receives said process data from said transfer source printing apparatus, and the transfer destination printing apparatus that executes the last sequential process transmits said output data to said transfer source printing apparatus.

20. The printing method as claimed in claim 19 further comprising the steps of:

determining a process sequential order for said plurality of transfer destination printing apparatuses by means of said transfer source printing apparatus; and notifying the determined process sequential order to said plurality of transfer destination printing apparatuses, wherein each of said plurality of transfer destination printing apparatuses executes the sequential process in accordance with the determined process sequential order.

* * * * *